United States Patent
Iyer et al.

(10) Patent No.: US 10,648,501 B2
(45) Date of Patent: May 12, 2020

(54) FLEXIBLE ROTATIONAL SHAFT

(71) Applicant: GOODRICH CORPORATION, Charlotte, NC (US)

(72) Inventors: Raghu Iyer, New Hartford, NY (US); Brayton Reed, Rome, NY (US)

(73) Assignee: GOODRICH CORPORATION, Charlotte, NC (US)

( * ) Notice: Subject to any disclaimer, the term of this patent is extended or adjusted under 35 U.S.C. 154(b) by 302 days.

(21) Appl. No.: 15/711,636

(22) Filed: Sep. 21, 2017

(65) Prior Publication Data
US 2019/0085890 A1    Mar. 21, 2019

(51) Int. Cl.
| F16D 3/76 | (2006.01) |
| F16C 1/04 | (2006.01) |
| F16C 1/06 | (2006.01) |
| F16D 3/06 | (2006.01) |
| F16D 3/72 | (2006.01) |
| F16C 1/02 | (2006.01) |

(52) U.S. Cl.
CPC .......... *F16C 1/04* (2013.01); *F16C 1/02* (2013.01); *F16C 1/06* (2013.01); *F16D 3/06* (2013.01); *F16D 3/72* (2013.01); *F16D 3/76* (2013.01); *F16C 2360/23* (2013.01)

(58) Field of Classification Search
CPC ...... F16C 1/04; F16C 1/06; F16C 1/02; F16C 2360/23; F16D 3/76; F16D 3/72; F16D 3/06
USPC ..................................................... 464/79, 99
See application file for complete search history.

(56) References Cited

U.S. PATENT DOCUMENTS

| 1,283,787 A | 11/1918 | Jencick |
| 2,883,839 A | 4/1959 | Troeger et al. |
| 3,455,013 A * | 7/1969 | Rayburn .................. F16D 3/72 464/79 |
| 4,232,756 A | 11/1980 | Bathelt |
| 4,265,099 A | 5/1981 | Johnson et al. |
| 5,158,504 A | 10/1992 | Stocco |
| 6,254,487 B1 | 7/2001 | Jacob |

(Continued)

FOREIGN PATENT DOCUMENTS

| FR | 616.929 | * 2/1927 | .................... 464/79 |
| JP | 2002054651 A | 2/2002 | |

OTHER PUBLICATIONS

European Search Report for Application No. 18195486.8 dated Apr. 18, 2019; 8 pages.

*Primary Examiner* — Greg Binda
(74) *Attorney, Agent, or Firm* — Cantor Colburn LLP

(57) ABSTRACT

A flexible shaft includes first and second shaft portions, first and second angular displacement couplings, and an axial displacement coupling generally extending and centered to a rotational axis. The first shaft portion extends between the first angular displacement coupling and the axial displacement coupling. The second shaft portion extends between the axial displacement coupling and the second angular displacement coupling. The axial displacement coupling includes an outer periphery, first wall attached to and extending radially between the first shaft portion and the periphery, and a second wall attached to and extending radially between the second shaft portion and the periphery. The first and second walls are resiliently flexible to facilitate axial displacement between the first and second shaft portions.

16 Claims, 2 Drawing Sheets

(56) References Cited

U.S. PATENT DOCUMENTS

| | | |
|---|---|---|
| 8,591,345 B2 | 11/2013 | Stocco et al. |
| 9,546,694 B2 | 1/2017 | Julian |
| 2010/0111691 A1 | 5/2010 | Heywood et al. |

* cited by examiner

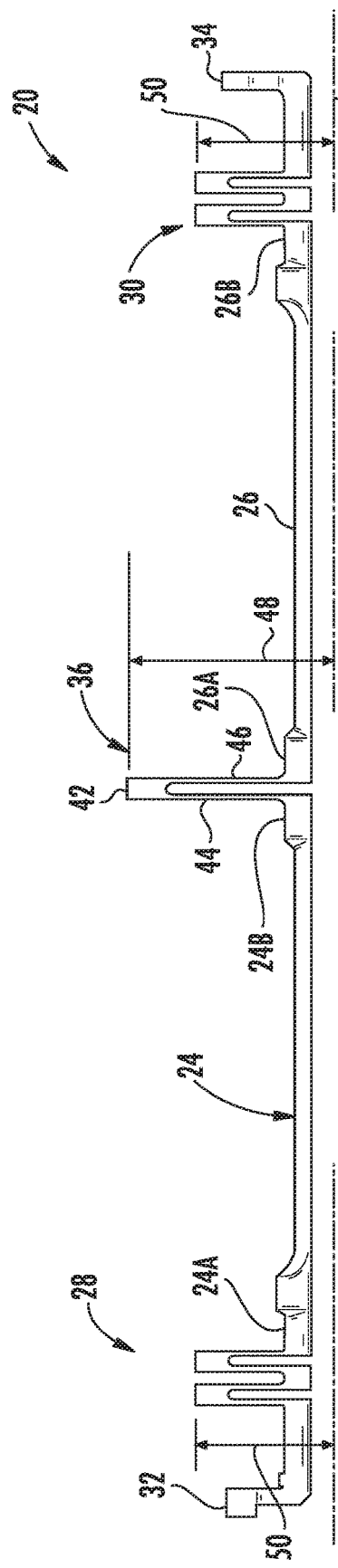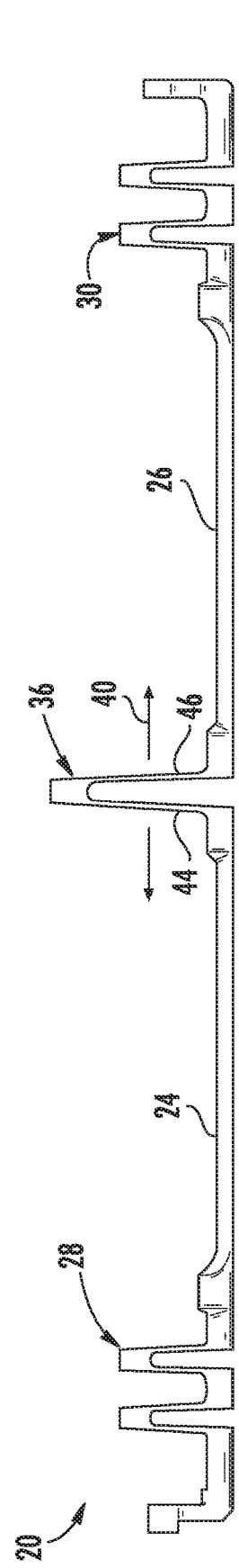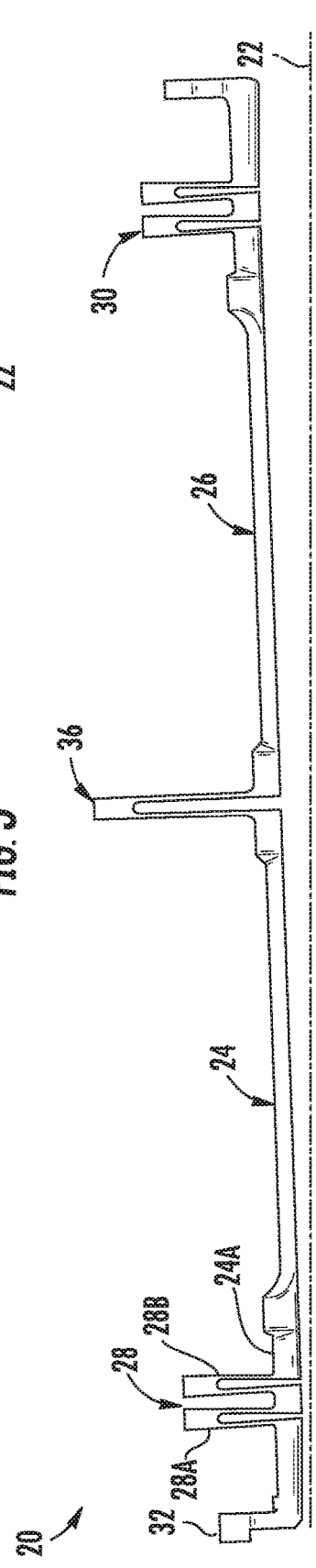

FLEXIBLE ROTATIONAL SHAFT

BACKGROUND

The present disclosure relates to a rotational shaft, and more particularly, to a flexible drive shaft.

Drive shafts are known to experience multiple misalignments that may include angular misalignment, parallel offset, axial displacement, and any combination of the three. Flexing of the drive shaft is unavoidable because the loads applied during normal operation, the alignment process, and the installation process may cause the shaft to bend. Yet further, thermal expansion, worn bearings, and installation errors may further contribute toward misalignment.

Traditional, flexible, drive shafts may utilize a sliding spline either at the end or the middle of the drive shaft to accommodate larger axial displacements. Additionally, disks in the couplings may accommodate small axial displacements. Unfortunately, this may contribute toward increases in weight and cost. The sliding spline may need periodic replacement, and the drive shafts may also need an axial limiting device inside of the couplings to prevent damage. Further improvements in the flexible drive shaft's capability is desirable to reduce weight, cost, and maintenance.

BRIEF DESCRIPTION

A flexible shaft according to one, non-limiting, embodiment of the present disclosure includes a first shaft portion extending along a rotational axis; a second shaft portion extending along the rotational axis; a first angular displacement coupling engaged to the first shaft portion; a second angular displacement coupling engaged to the second shaft portion; and an axial displacement coupling including an outer periphery, a first wall engaged to and extending radially between the first shaft portion and the outer periphery, a second wall spaced axially from the first wall and engaged to and extending radially between the second shaft portion and the outer periphery, wherein the first and second walls are resiliently flexible to facilitate axial displacement between the first and second shaft portions, and the first wall is spaced axially from the first angular displacement coupling by the first shaft portion and the second wall is spaced axially from the second angular displacement coupling by the second shaft portion.

Additionally to the foregoing embodiment the first shaft portion includes opposite first and second end segments and the first wall is engaged to the second end segment, and the second shaft portion includes opposite third and fourth end segments and the second wall is engaged to the third end segment.

In the alternative or additionally thereto, in the foregoing embodiment, the first and second walls are annular in shape.

In the alternative or additionally thereto, in the foregoing embodiment, the first angular displacement coupling is engaged to the first end segment.

In the alternative or additionally thereto, in the foregoing embodiment, the second angular displacement coupling is engaged to the fourth end segment.

In the alternative or additionally thereto, in the foregoing embodiment, the second end segment is spaced axially from the third end segment.

In the alternative or additionally thereto, in the foregoing embodiment, the second end segment is spaced axially from the third end segment.

In the alternative or additionally thereto, in the foregoing embodiment, a radius of the axial displacement coupling is greater than the radii of the first and second angular displacement couplings.

In the alternative or additionally thereto, in the foregoing embodiment, the axial displacement coupling is constructed and arranged to relieve axial loading.

In the alternative or additionally thereto, in the foregoing embodiment, the flexible shaft is a single piece drive shaft.

In the alternative or additionally thereto, in the foregoing embodiment, the first and second shaft portions have substantially equal axial lengths.

In the alternative or additionally thereto, in the foregoing embodiment, the axial displacement coupling has greater axial compliancy than the first and second angular displacement couplings.

A flexible drive shaft according to another, non-limiting, embodiment includes a first angular displacement coupling; a second angular displacement coupling; an axial displacement coupling; a first shaft portion attached to and extending between the first angular displacement coupling and the axial displacement coupling; and a second shaft portion attached to and extending between the axial displacement coupling and the second angular displacement coupling, wherein the first and second shaft portions extend along a rotational axis and the first shaft portion is spaced axially from the second shaft portion by the axial displacement coupling.

Additionally to the foregoing embodiment, the first and second angular displacement couplings and the axial displacement coupling are concentric to the rotational axis.

In the alternative or additionally thereto, in the foregoing embodiment, an outer radius of the axial displacement coupling is greater than outer radii of the first and second angular displacement couplings.

In the alternative or additionally thereto, in the foregoing embodiment, the axial displacement coupling is a bellows.

In the alternative or additionally thereto, in the foregoing embodiment, the axial displacement coupling includes an outer periphery, a first wall engaged to and extending radially between the first shaft portion and the outer periphery, a second wall spaced axially from the first wall and engaged to and extending radially between the second shaft portion and the outer periphery.

In the alternative or additionally thereto, in the foregoing embodiment, the first and second walls are resiliently flexible to facilitate axial displacement between the first and second shaft portions.

In the alternative or additionally thereto, in the foregoing embodiment, the axial displacement coupling has greater axial compliancy than the first and second angular displacement couplings.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIG. 2 is a partial cross section of the flexible drive shaft illustrated in an unloaded state;

FIG. 3 is a partial cross section of the flexible drive shaft illustrated in an axial stretched state; and FIG. 4 is a partial cross section of the flexible drive shaft illustrated in an angular offset state.

DETAILED DESCRIPTION

Figure 1:
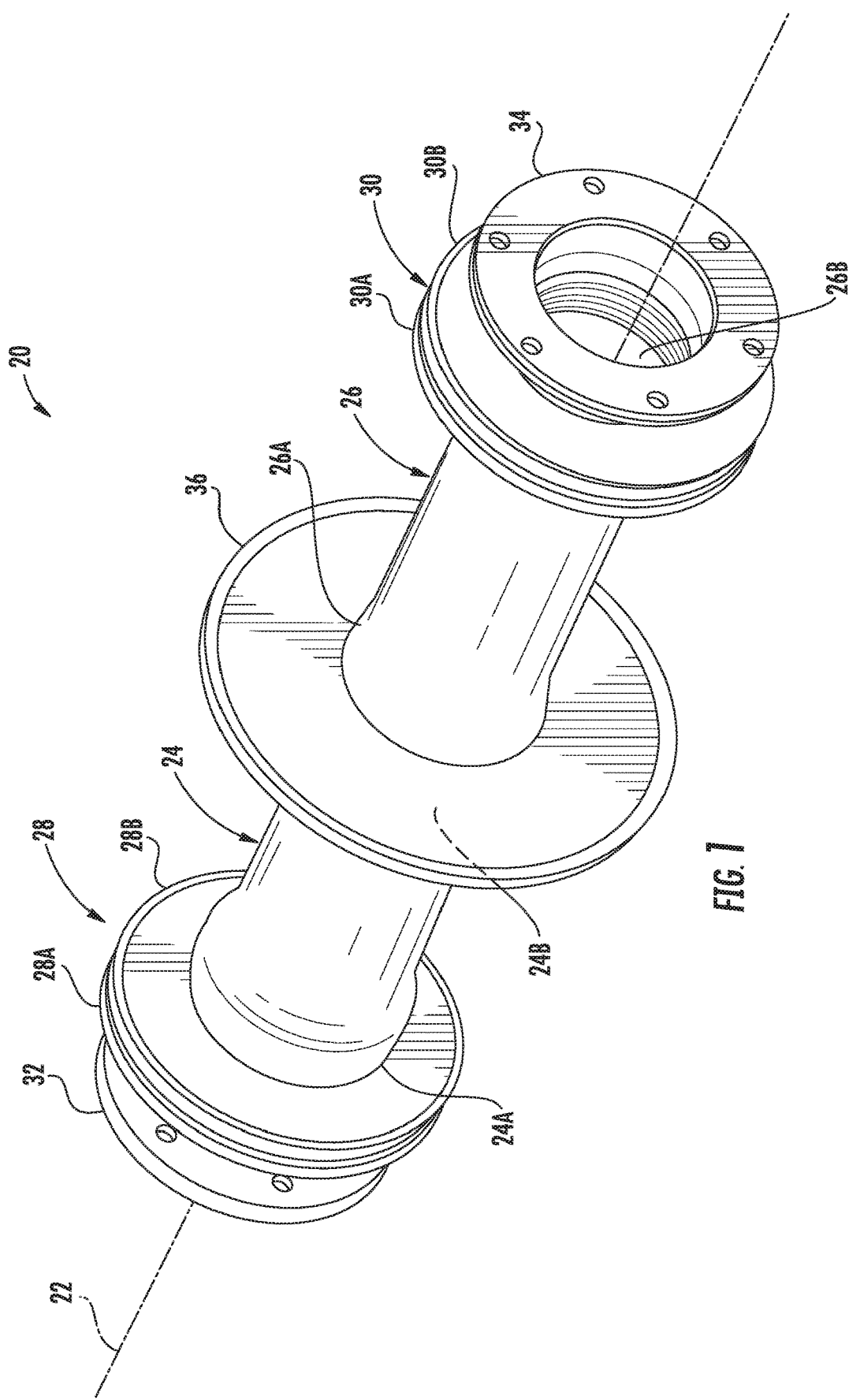
FIG. 1 is a perspective view of a flexible drive shaft as one exemplary embodiment.

Referring to FIG. 1, a flexible rotating shaft 20 generally extends along a rotational axis 22 and is adapted to flex angularly (i.e., angular offset with respect to axis 22) and stretch or flex axially (i.e., an elongation or contraction of the axial length of shaft 20). The flexible drive shaft 20 may include first and second shaft portions 24, 26, first and second angular displacement couplings 28, 30, first and second flanges 32, 34, and an axial displacement coupling 36. In one embodiment, the rotating shaft 20 may be a drive shaft.

The first angular displacement coupling 28 may be axially located between and is engaged to the first flange 32 and the first shaft portion 24. The first shaft portion 24 may include axially opposite end segments 24A, 24B, and may extend axially between and is engaged to the first angular displacement coupling 28 at end segment 24A and the axial displacement coupling 36 at end segment 24B. The second shaft portion 26 may include axially opposite end segments 26A, 26B, and may extend axially between, and is engaged to, the axial displacement coupling 36 at end segment 26A and the second angular displacement coupling 30 at end segment 26B. The second angular displacement coupling 30 may be axially located between and is engaged to the end segment 26B of the second shaft portion 26 and the second flange 34.

The axial location of the angular displacement couplings 28, 30 along shaft 20 may be substantially symmetric about the axial displacement coupling 36. The shaft portions 24, 26 may be of similar axial length to locate the axial and angular couplings. The central location of the axial displacement coupling 36 on the rotational shaft assures optimal operation.

The first and second flanges 32, 34 may be generally annular in shape, may be centered to the rotational axis 22, and facilitate attachment to rotational devices (not shown). For example, the first flange 32 may attach, or bolt, to a gearbox of an aircraft driven by a turbine engine. The second flange 34 may attach, or bolt, to an accessory gearbox or bearing hanger. It is contemplated and understood that the flexible rotating shaft 20 may include any variety of applications where the transference of mechanical energy is desired.

The first and second angular displacement couplings 28, 30 are each substantially centered about the rotational axis 22, and may each include at least one bellows. For example, the first angular displacement coupling 28 may include two axially spaced bellows 28A, 28B, and the second angular displacement coupling 30 may include two axially spaced bellows 30A, 30B. In operation, the angular displacement couplings 28, 30 facilitate angular displacement between the respective, adjacent, flanges 32, 34 and the respective, adjacent, shaft portions 24, 26, by flexing the bellow walls. More specifically, as the bellows 28A, 28B resiliently flex toward an increase in angular displacement, an outer peripheries 30A, 30B of the respective bellows 28A, 28B (see FIG. 4) move axially toward one-another at a circumferential location associated with the angular displacement. In more traditional angular displacement couplings, the magnitude of this limitation is generally preserved by limiting, or preventing, and axial displacement of the more traditional angular displacement couplings via axial displacement limiter devices integrated into the more traditional angular displacement couplings. In one embodiment, the angular displacement couplings 28, 30 may be couplings known to one skilled in the art, except that axial limiter devices utilized in such angular displacement couplings may not be needed due to the contribution of the axial displacement coupling 36.

Referring to FIGS. 1 and 2, the axial displacement coupling 36 facilitates axial displacement between the shaft portions 24, 26. More specifically and in one embodiment, an axial force (see arrows 40 in FIG. 3) necessary to cause axial displacement of the axial displacement coupling 36 may be substantially less than an axial force needed to cause the angular displacement couplings to, undesirably, displace axially. That is, the axial force 40 is generally applied to the entire shaft 20, and not just the axial displacement coupling 36. All loads are applied to the end flanges 32, 34. The axial load is distributed between all of the couplings, with the more compliant axial displacement coupling 36 taking up a larger portion of the total axial displacement than the angular displacement couplings 28, 30.

The axial displacement coupling 36 may be a bellows, or bellow-like, and may include an outer periphery 42, a resiliently flexible first wall 44, and a resiliently flexible second wall 46. The outer periphery 42 may be substantially round, circumferentially continuous, and is substantially spaced radially outward from the first and second shaft portions 24, 26. The first and second walls 44, 46 may be annular in shape, are axially spaced from one another, and facilitate axial spacing of the first shaft portion 24 from the second shaft portion 26. The first wall 44 is attached to, and extends radially between, the end segment 24B of the first shaft portion 24 and the outer periphery 42. The second wall 46 is attached to, and extends radially between, the end segment 26A of the second shaft portion 26 and the outer periphery 42.

Referring to FIG. 2, the flexible rotating shaft 20 is illustrated in an unloaded state where no angular or axial forces are exerted upon the respective angular displacement coupling(s) 28, 30 and the axial displacement coupling 36. In FIG. 3, the flexible rotating shaft 20 is illustrated in an axial stretched state where the axial force 40 causes the walls 44, 46 of the axial displacement coupling 36 to flex axially away from one-another at and/or near the shaft portions 24, 26. That is, the shaft portions 24, 26 shift axially away from one another causing the walls 44, 46 to resiliently flex as the walls are carried by the respective shaft portion 24, 26. When the rotating shaft 20 is in the axial stretched state, the angular displacement couplings 28, 30 may also be stretched axially; however, the axial displacement of the angular displacement couplings 28, 30 is substantially smaller than the axial displacement of the axial displacement coupling 36. The addition of the axial displacement coupling 36 removes some of the axial displacement burden from the angular displacement couplings 28, 30. The angular displacement couplings 28, 30 are thereby capable of handling additional non-axial loads.

Referring to FIG. 4, the flexible rotating shaft 20 is illustrated in an angular offset state (i.e., parallel offset) with respect to rotational axis 22. That is, the rotational axes (not shown) of each respective flange 32, 34 are parallel but not concentric with each other. When in the angular offset state, angular displacement couplings 28, 30 are resiliently flexed while the axial displacement coupling 36 may generally remain in a neutral orientation. In one embodiment, when the angular displacement coupling 28 is flexed, the end segment 24A of shaft portion 24 may be closer to the flange 32 at one circumferential point while at a diametrically opposite circumferential point may be further away from the flange 32. As such, the angular displacement coupling 28 may generally provide no, or little, axial displacement but does provide angular displacement.

Referring again to FIG. 2, the axial displacement coupling 36 may include a radius (see arrow 48) and the angular displacement couplings 28, 30 may each include a radius (see arrow 50). In one embodiment, the radius 48 of the axial displacement coupling may be substantially larger than the radius 50 of the angular displacement couplings 28, 30. High ratios (coupling 36 radius over coupling 28, 30 radius) are desirable; however, packaging and envelope limitations may restrict very large ratios. Because the axial displacement coupling 36 does not have to accommodate angular misalignment, the geometry of coupling 36 may be tailored to better accommodate axial displacement. A larger radius on the axial displacement coupling 36 allows more material to flex making the coupling more axially compliant than angular displacement couplings 28, 30.

In one example, the flexible rotating shaft 20 may be a single piece that may be a drive shaft. The term "single piece" may include a shaft that is assembled from multiple components but when operating, may not include separate devices with multiple parts. For example, the flexible rotating shaft 20 may not require a splined joint for axial movement between two separate shaft portions. Also, the flexible rotating shaft 20 does not require axial limiters (i.e., devices) as part of the angular displacement couplings.

Advantages and benefits of the present disclosure include a flexible rotating shaft that is lighter and has fewer parts than more conventional shafts. Other advantages include a shaft capable of axial displacement with no sliding parts thus needing no lubrication, and resulting in no, or little, wear. Because the angular displacement couplings are relieved of most axial displacement by the axial displacement coupling 36, the angular displacement couplings 28, 30 may accommodate additional angular misalignment.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A flexible shaft comprising:
a first shaft portion extending along a rotational axis;
a second shaft portion extending along the rotational axis;
a first angular displacement coupling engaged to the first shaft portion;
a second angular displacement coupling engaged to the second shaft portion; and
an axial displacement coupling including an outer periphery, a first wall engaged to and extending radially between the first shaft portion and the outer periphery, a second wall spaced axially from the first wall and engaged to and extending radially between the second shaft portion and the outer periphery, wherein the first and second walls are resiliently flexible to facilitate axial displacement between the first and second shaft portions, and the first wall is spaced axially from the first angular displacement coupling by the first shaft portion and the second wall is spaced axially from the second angular displacement coupling by the second shaft portion, wherein the first angular displacement coupling, the second angular displacement coupling, and the axial displacement coupling are bellows, and wherein a radius of the axial displacement coupling is greater than the radii of the first and second angular displacement couplings.

2. The flexible shaft set forth in claim 1, wherein the first shaft portion includes opposite first and second end segments and the first wall is engaged to the second end segment, and the second shaft portion includes opposite third and fourth end segments and the second wall is engaged to the third end segment.

3. The flexible shaft set forth in claim 2, wherein the first and second walls are annular in shape.

4. The flexible shaft set forth in claim 3, wherein the first angular displacement coupling is engaged to the first end segment.

5. The flexible shaft set forth in claim 4, wherein the second angular displacement coupling is engaged to the fourth end segment.

6. The flexible shaft set forth in claim 5, wherein the second end segment is spaced axially from the third end segment.

7. The flexible drive shaft set forth in claim 5, wherein the first and second shaft portions have substantially equal axial lengths.

8. The flexible shaft set forth in claim 2, wherein the second end segment is spaced axially from the third end segment.

9. The flexible shaft set forth in claim 1, wherein the axial displacement coupling is constructed and arranged to relieve axial loading.

10. The flexible shaft set forth in claim 1, wherein the flexible shaft is a single piece drive shaft.

11. A flexible drive shaft comprising:
a first shaft portion extending along a rotational axis;
a second shaft portion extending along the rotational axis;

a first angular displacement coupling engaged to the first shaft portion;
a second angular displacement coupling engaged to the second shaft portion; and
an axial displacement coupling including an outer periphery, a first wall engaged to and extending radially between the first shaft portion and the outer periphery, a second wall spaced axially from the first wall and engaged to and extending radially between the second shaft portion and the outer periphery, wherein the first and second walls are resiliently flexible to facilitate axial displacement between the first and second shaft portions, and the first wall is spaced axially from the first angular displacement coupling by the first shaft portion and the second wall is spaced axially from the second angular displacement coupling by the second shaft portion, wherein the first angular displacement coupling, the second angular displacement coupling, and the axial displacement coupling are bellows, and
wherein the axial displacement coupling has greater axial compliancy than the first and second angular displacement couplings.

12. A flexible drive shaft comprising:
a first angular displacement coupling;
a second angular displacement coupling;
an axial displacement coupling;
a first shaft portion attached to and extending between the first angular displacement coupling and the axial displacement coupling; and
a second shaft portion attached to and extending between the axial displacement coupling and the second angular displacement coupling, wherein the first and second shaft portions extend along a rotational axis and the first shaft portion is spaced axially from the second shaft portion by the axial displacement coupling, wherein the first angular displacement coupling, the second angular displacement coupling, and the axial displacement coupling are each bellows, and wherein an outer radius of the axial displacement coupling is greater than outer radii of the first and second angular displacement couplings.

13. The flexible drive shaft set forth in claim 12, wherein the first and second angular displacement couplings and the axial displacement coupling are concentric to the rotational axis.

14. The flexible drive shaft set forth in claim 12, wherein the axial displacement coupling includes an outer periphery, a first wall engaged to and extending radially between the first shaft portion and the outer periphery, a second wall spaced axially from the first wall and engaged to and extending radially between the second shaft portion and the outer periphery.

15. The flexible drive shaft set forth in claim 14, wherein the first and second walls are resiliently flexible to facilitate axial displacement between the first and second shaft portions.

16. The flexible drive shaft set forth in claim 12, wherein the axial displacement coupling has greater axial compliancy than the first and second angular displacement couplings.

* * * * *